(12) United States Patent
Ng et al.

(10) Patent No.: US 9,997,141 B2
(45) Date of Patent: Jun. 12, 2018

(54) DISPLAY SYSTEM AND METHOD SUPPORTING VARIABLE INPUT RATE AND RESOLUTION

(71) Applicant: OmniVision Technologies, Inc., Santa Clara, CA (US)

(72) Inventors: Sunny Yat-san Ng, San Jose, CA (US); Xing Sun, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days. days.

(21) Appl. No.: 15/264,000

(22) Filed: Sep. 13, 2016

(65) Prior Publication Data

US 2018/0075822 A1    Mar. 15, 2018

(51) Int. Cl.
*G09G 5/39*  (2006.01)
*G09G 5/393*  (2006.01)

(52) U.S. Cl.
CPC ..... *G09G 5/393* (2013.01); *G09G 2310/0235* (2013.01); *G09G 2310/08* (2013.01); *G09G 2320/0261* (2013.01); *G09G 2360/18* (2013.01)

(58) Field of Classification Search
CPC .............. G09G 5/393; G09G 2310/08; G09G 2360/18; G06T 1/60

USPC ................................ 345/545, 530, 559, 560
See application file for complete search history.

(56) References Cited

U.S. PATENT DOCUMENTS

| | | | | |
|---|---|---|---|---|
| 2009/0033670 | A1* | 2/2009 | Hochmuth | G06F 3/1454 345/545 |
| 2010/0321402 | A1* | 12/2010 | Han | G06F 3/1415 345/619 |
| 2014/0063034 | A1* | 3/2014 | Abarca | G06F 3/1415 345/545 |
| 2014/0125685 | A1* | 5/2014 | Yeh | G09G 5/393 345/545 |
| 2014/0267329 | A1* | 9/2014 | Lee | G06T 1/20 345/522 |

* cited by examiner

*Primary Examiner* — Jacinta M Crawford
(74) *Attorney, Agent, or Firm* — Larry E. Henneman, Jr.; Henneman & Associates, PLC

(57) ABSTRACT

A display system includes a pixel array, a data buffer and a display driver. In a particular embodiment the data buffer receives and stores frames of image data and provides the frames of image data to the pixel array. The display driver overwrites an entire frame of image data on the data buffer during some frame times and selectively overwrites a portion of a frame of image data, leaving another portion of the frame of image data in the data buffer, during other frame times.

34 Claims, 12 Drawing Sheets

DISPLAY SYSTEM AND METHOD SUPPORTING VARIABLE INPUT RATE AND RESOLUTION

BACKGROUND OF THE INVENTION

Field of the Invention

This invention relates generally to digital video displays, and more particularly to digital video displays with decreased processing requirements.

Description of the Background Art

Digital video displays are known. These displays generally include a pixel array, a data buffer, and a display driver. The display driver processes incoming image data and writes the image data into the data buffer, which then asserts the image data onto the pixel array in order to create digital images. Typically, each pixel of a single frame of video data is specified by a 24-bit data word. Therefore, high resolution displays, (i.e. 2560×1440) require that tens of millions of bits be written to the data buffer in a sixtieth of a second. While this rate is achievable, the processing power required to write large numbers of data bits into a data buffer every second is significant.

What is needed, therefore, is a digital display that reduces the required processing of video data. What is also needed is a digital display that requires less power. What is also needed is a digital display that can accept video data at a variable input rate.

SUMMARY

The inventors have observed that, often times, video data will include consecutive frames that have very similar content. For example, during a video, the background might not change, even though the foreground does. In these instances digital displays repeatedly write the same pixel data to the data buffer, wasting processing resources and data transfer bandwidth.

The present invention overcomes the problems associated with the prior art by providing a display system that selectively overwrites portions of previously stored frames of image data in a data buffer with new image data as needed. The display system facilitates updating groups of pixels associated with regions of an image that have changed compared to the previous frame, without updating the entire image. The display system determines the region(s) of changed pixels based on information encoded in the image data corresponding to the new frame. The invention facilitates displaying video data while substantially reducing the required processing power by, for example, only overwriting a portion of the image data (e.g., a window in the image) in the data buffer. Another aspect of the invention is a method of displaying image data, that includes selectively overwriting only a portion of a previously displayed frame of image data, based on differences between a new frame and the previously displayed frame.

An example embodiment includes a pixel array, a data buffer, and a display driver. The data buffer is electrically coupled to receive and store image data. The data buffer is also operative to provide the image data to the pixel array and includes a first portion configured to store a complete frame of data. The display driver is electrically coupled to provide the image data and control signals to the data buffer and includes a controller. The controller is operative to write a first frame of image data to the first portion of the data buffer and cause the first frame of image data to be asserted on pixels of the array during a first frame time. The controller is also operative to write new image data over a first portion of the first frame of image data in the first portion of the data buffer, leave a second portion of the first frame of image data in the first portion of the data buffer, and cause the new image data and the second portion of the first frame of image data to be asserted on the pixels of the array during a same subsequent frame time.

In another example embodiment, the display driver is configured to receive data indicative of a location of the first portion of image data in the first portion of the frame buffer and writes the new image data to the location. In a particular example embodiment, the first frame of image data corresponds to an image to be displayed on the pixel array, and the location corresponds to a rectangular portion of the image. In another particular example embodiment, the display driver is configured to write new image data over the entirety of the first frame of image data, if the data indicative of the location of the first portion of image data in the first portion of the data buffer is equal to one of a set of predefined values (e.g. zero).

In another example embodiment, the display driver provides synchronization signals to a source of the image data, each of the synchronization signals indicating the beginning of a time period when at least a portion of a next frame of image data can be sent. In a particular example embodiment, the display driver provides consecutive ones of the synchronization signals periodically, and the period of the synchronization signals corresponds to an amount of time required to assert a full frame of image data onto the pixel array.

In yet another example embodiment, the display driver is operative to write a row of the new image data to a first row register and copy a corresponding row of image data from the data buffer into a second row register. The display driver is also operative to selectively overwrite one or more portions of the corresponding row of image data in the second row register with one or more portions of the row of the new image data in the first row register to create a row of updated image data in the second row register. Additionally, the display driver is operative to overwrite the corresponding row of image data in the data buffer with the row of updated image data from the second row register.

In a more particular example embodiment, the display driver further includes a mask register operative to receive a row of mask values from the controller. Each mask value corresponds to an associated image data value in the first row register and an associated image data value in the second row register. Responsive to a first mask value, the associated image data value in the second row register is overwritten by the associated image data value in the first row register. Responsive to a second mask value, the associated image data value in the second row register is not overwritten by the associated image data value in the first row register.

In another example embodiment, the display driver receives new data in a first format and converts the new data to a second format, creating the new image data.

In yet another example embodiment, the data buffer includes a second portion configured to store an additional complete frame of image data. The controller is operative to write a second frame of image data to the second portion of the data buffer, and cause the second frame of image data to be asserted on the pixels of the display during an intermediate frame time between the first frame time and the subsequent frame time. Additionally, the controller is operative to write additional new image data over a first portion of the second frame of image data in the second portion of the data buffer, leave a second portion of the second frame of image data in the second portion of the data buffer, and cause the additional new image data and the second portion of the second frame of image data to be asserted on the pixels of the display during a same fourth frame time after the subsequent frame time.

An example method for writing image data to a display is also described. The method includes writing a first frame of image data to a frame buffer and causing the first frame of image data to be asserted on pixels of the display during a frame time. The method also includes writing new image data over a first portion of the first frame of image data in the frame buffer, leaving a second portion of the first frame of image data in the frame buffer, and causing the new image data and the second portion of the first frame of image data to be asserted on the pixels of the display during a same subsequent frame time. In a particular method, the step of writing new image data over a first portion of the first frame of image data includes receiving data indicative of a location of the first portion of data in the frame buffer and writing the new data to the location. In a more particular method, the first frame of image data corresponds to an image to be displayed on the display, and the location corresponds to a rectangular portion of the image. In another more particular method, the step of writing new image data over a first portion of the first frame of image data in the frame buffer includes writing new image data over the entirety of the first frame of image data, if the data indicative of the location of the first portion of image data in the frame buffer is equal to one of a set of predefined values (e.g. zero).

Another example method includes providing synchronization signals to a source of the image data, each of the synchronization signals indicating the beginning of a time period when at least a portion of a next frame of image data can be provided to the display driver circuit. In a more particular method, the step of providing synchronization signals to the source of the image data further includes providing consecutive ones of the synchronization signals periodically, the period of the synchronization signals corresponding to an amount of time required to assert a full frame of the image data onto the pixel array.

Yet another example method includes writing a row of the new image data to a first row register and copying a corresponding row of image data from the frame buffer into a second row register. The method also includes selectively overwriting one or more portions of the corresponding row of image data with one or more portions of the row of the new image data in the first row register to create a row of updated image data in the second row register and overwriting the corresponding row of image data in the frame buffer with the row of updated image data. In a particular example method, the step of selectively overwriting one or more portions of the corresponding row of image data with one or more portions of the row of the new image data includes generating a row of mask values and selectively overwriting the one or more portions of the corresponding row of image data based on the row of mask values.

In another example method, the step of writing new image data over a first portion of the first frame of data in the frame buffer includes receiving new data in a first format and converting the new data to a second format, to create the new image data.

In another example method, the step of writing a first frame of image data to a frame buffer includes writing the first frame of image data to a first portion of the frame buffer. The method also includes writing a second frame of image data to a second portion of the frame buffer and causing the second frame of image data to be asserted on pixels of the display during an intermediate frame time between the first frame time and the subsequent frame time.

Additionally, the method includes writing additional new image data over a first portion of the second frame of image data in the second portion of the frame buffer, leaving a second portion of the second frame of image data in the frame buffer, and causing the additional new image data and the second portion of the second frame of image data to be asserted on the pixels of the display during a fourth frame time after the subsequent frame time.

Another example display system includes a pixel array, a data buffer electrically coupled to receive and store frames of image data, and a display driver electrically coupled to provide the image data and control signals to the data buffer. The data buffer is operative to provide the image data to the pixel array and is configured to store at least one complete frame of data. The display driver is operative to write a complete frame of image data to the data buffer during some frame times. The system additionally includes a means for overwriting selected portions of prior frames of image data in the data buffer with new image data and leaving other portions of the prior frames of image data in the data buffer during other frame times.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a display system and method of implementation that reduces processing requirements by selectively overwriting frames of image data in the data buffer. In the following description, numerous specific details are set forth (e.g., buffer configuration, data format, etc.) in order to provide a thorough understanding of the invention. Those skilled in the art will recognize, however, that the invention may be practiced apart from these specific details. In other instances, details of well-known digital display practices (e.g., routine optimization, data planarization, etc.) and components have been omitted, so as not to unnecessarily obscure the present invention.

Figure 1:
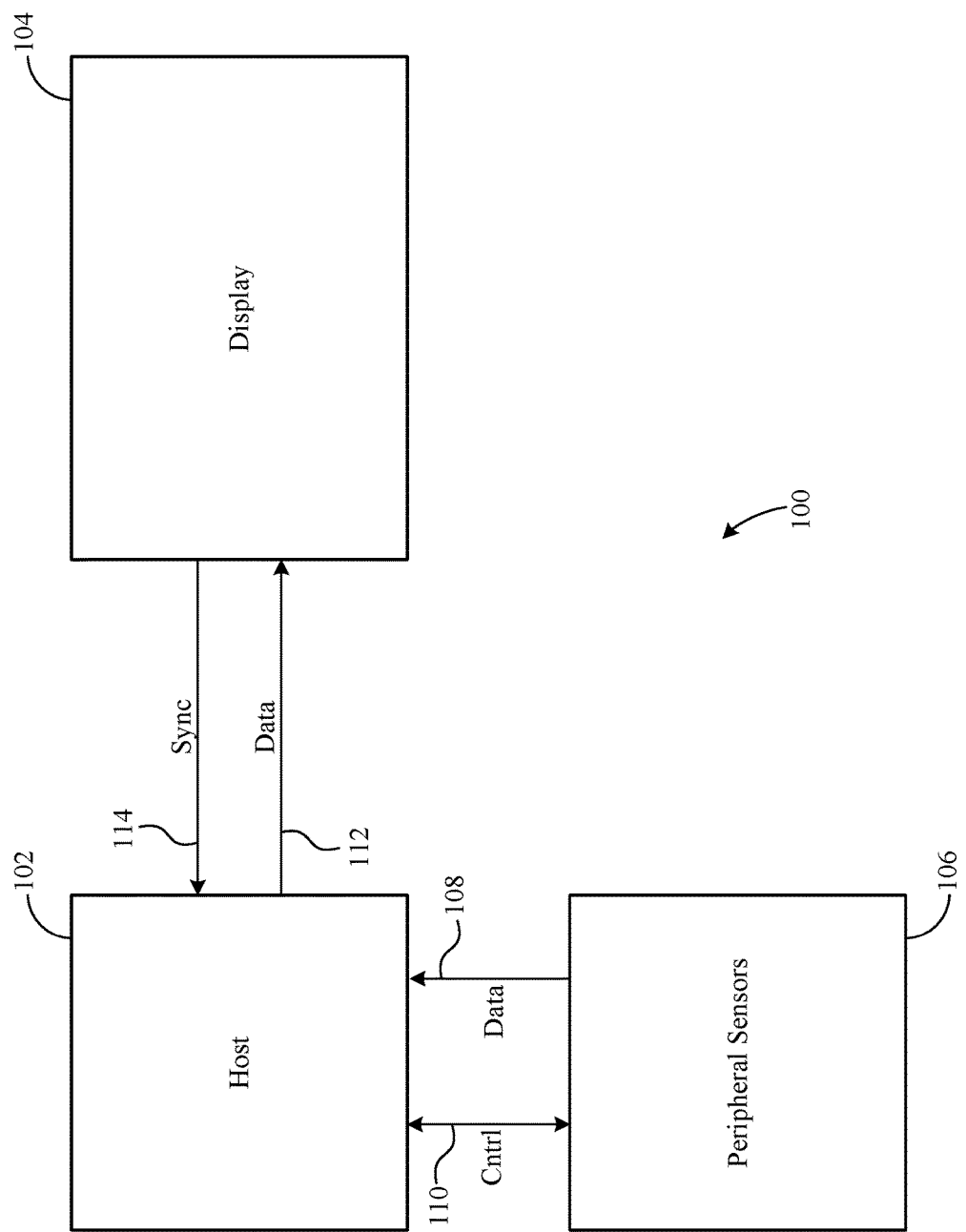
FIG. 1 is a block diagram showing an example display system.

FIG. 1 shows a display system 100, including a host 102, a display 104, and peripheral sensors 106 (e.g., image sensors). Host 102 includes image data stored therein, which it can alter based at least in part on data received from peripheral sensors 106, via a data bus 108. Additionally, host 102 provides control signals to peripheral sensors 106, via a control bus 110, allowing host 102 to affect the functionality of peripheral sensors 106. Host 102 also provides image data to display 104, via a data bus 112. The image data is organized into frames, which display 104 displays one at a time. Display 104 asserts a periodic sync signal on a sync bus 114, defining a temporal window during which host 102 can send a next frame of image data display 104.

In alternate embodiments, host 102 can be any type of device (e.g. a cell phone, an electronic tablet, a computer, etc.). Host 102 can also have display 104 and peripheral devices 106 embodied therein and can include any number of additional devices (e.g. microphones, image sensors, accelerometers, etc.). Because of the additional devices embodied therein, host 102 could serve any number of functions concurrently and or in concert with the display functions described in this disclosure.

Additionally, image data can be received from an external data source, via a wired connection (e.g. a universal serial bus (USB)) or a wireless connection (e.g. Bluetooth®). In such an embodiment, host 102 would alter the image data as needed based on data received from peripheral sensors 106 and/or meta data within the image data stream.

Figure 2:
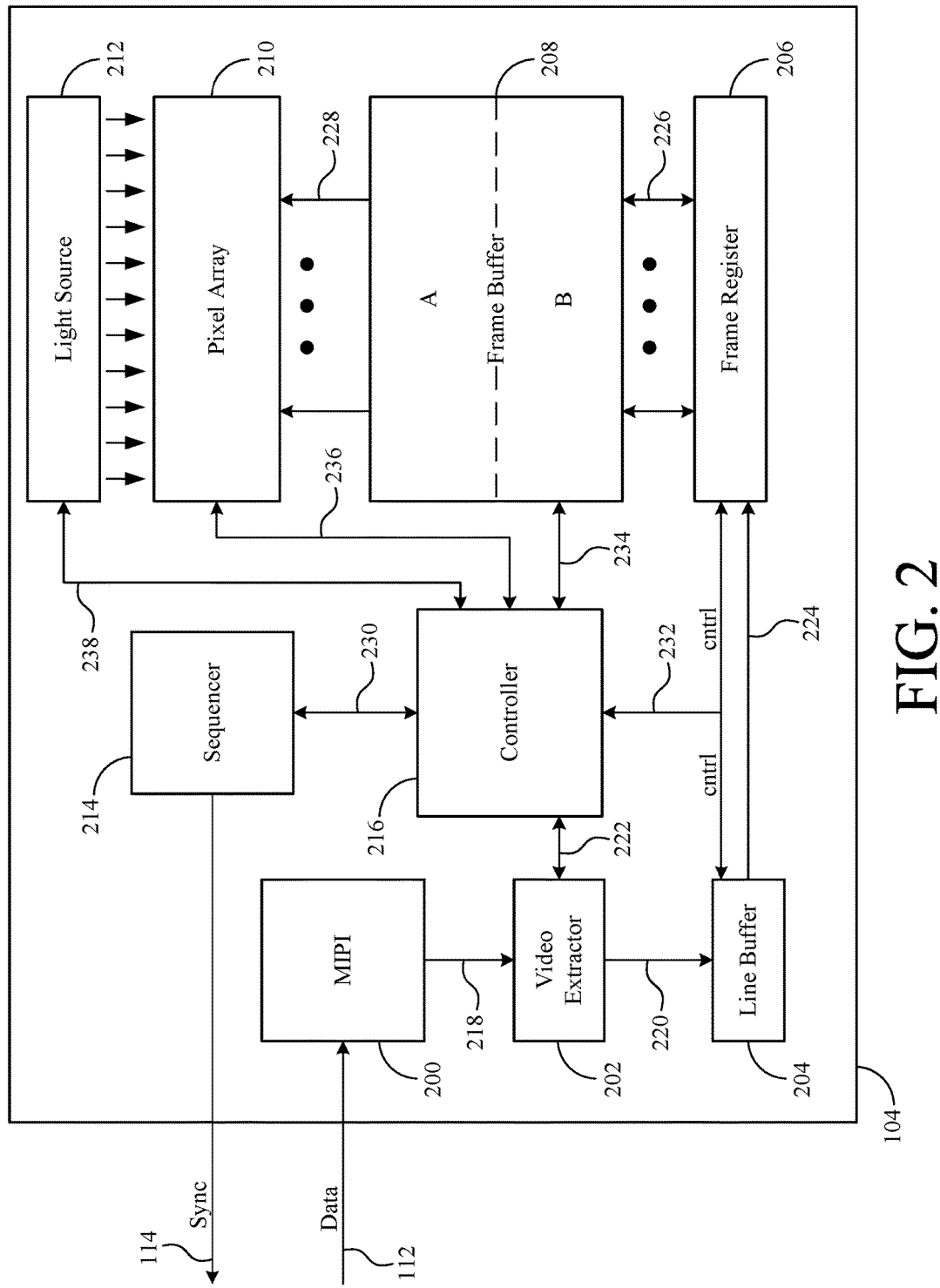
FIG. 2 is a block diagram showing an example embodiment of the display of FIG. 1 in greater detail.

FIG. 2 shows display 104, including a mobile industry processor interface (MIPI) 200, a video extractor 202, a line buffer 204, a frame register 206, a frame buffer 208, a pixel array 210, a light source 212, a sequencer 214, and a controller 216. MIPI 200 receives image data from host 102 (FIG. 1), via data bus 112. Host 102 sends image data in a format (e.g. MIPI format) that is readily received by MIPI 200, but must be converted before being displayed. MIPI 200 converts the image data from the received format into a format (e.g. RGB data) that can be displayed by display 104, and sends the converted image data to video extractor 202, via a data bus 218. In alternate embodiments MIPI 200 could be replaced by any appropriate wired or wireless interface, including, but not limited to, a high-definition multimedia interface (HDMI), a serial digital interface (SDI), a mobile high-definition link (MHL) or a Wireless Display interface (WiDi).

Video extractor 202 receives the data and extracts information about the corresponding image from it. The information extracted is included in the data as a first line that is not intended to be displayed. This first line of data includes information that determines whether the image data includes an entire frame or only a portion of a frame f image data. It also indicates where in frame buffer 208 the corresponding image data should be written. After parsing this information from the image data, video extractor 202 sends the remaining image data (at least a portion of which will be displayed) to line buffer 204, via a data bus 220, and provides control signals, via a control bus 222, to controller 216. These control signals are generated based on the information in the first line of data and are used by controller 216 to coordinate the function of other components of display 104, as will be described in greater detail below.

Line buffer 204 receives image data from video extractor 202, and reorganizes the image data for transfer to frame register 206, on a row-by-row basis. Frame register 206 receives the image data one row (or portion of a row) at a time, via a data bus 224, and writes each row (or portion of a row) to frame buffer 208, via a data bus 226. If the image data being written to frame buffer 208 includes only a portion of a frame of image data, frame register 206 facilitates overwriting only selective portions of the previously written frame, as will be described in greater detail with reference to FIG. 8.

Frame buffer 208 is a typical dual frame buffer, which can hold two entire frames of image data at any one time. Every other frame is written to a first portion, denoted by "A" or a second portion, denoted by "B". Based at least in part on the differences between the new image data and the old image data, the old frame of data will not be overwritten, be partially overwritten, or be completely overwritten by new image data. For example, if a scene changes completely, frame register 206 will overwrite the entirety of the next two frames of image data in frame buffer 208. Alternatively, if only the foreground changes, frame register 206 will only overwrite the portion(s) of the upcoming frames that includes the changes. If the picture is static and there is no difference between the next frames and the previous frames, frame register 206 will not overwrite any of the data of the previous frame.

Frame buffer 208 writes each frame of image data to pixel array 210, via a data bus 228. When a frame of image data is being asserted on pixel array 210, light source 212 illuminates pixel array 210 to generate an imaging beam infused with an image corresponding to the asserted image data. The imaging beam reflects off the pixel array, or is transmitted through it, and impinges on, for example, a screen (not shown), optics (not shown), or the eye(s) of a user.

In the example embodiment, pixel array 210 is a reflective liquid crystal on silicon (LCOS) display panel and light source 212 is an RGB light source. In alternate embodiments pixel array 210 could be replaced, for example, a transmissive liquid crystal display panel, a light emitting diode (LED) display panel, or any other type of spatial light modulator.

Sequencer 214 coordinates the sequencing of data transfer between frame buffer 208 and pixel array 210, by providing control signals, via a control bus 230, to controller 216. The control signals (e.g., a series of row addresses) provide information to controller 216, which are used to coordinate the writing of image data from frame buffer 208 to pixel array 210 and to control light source 212 in coordination with the image data being asserted on pixel array 210.

Sequencer 214 also sends a periodic sync signal, via sync bus 114, to host 102. The sync signal defines a temporal window, during which host 102 can send a new frame (or portion of a frame) of video data to MIPI 200 via data bus 112. Typically, sixty frames are displayed every second, so one-sixtieth of a second is a reasonable period for the sync signal. For display 104 to maintain the 60 fps refresh rate, host 102 must send a new frame or all of the secondary windows (portions of a frame) corresponding to a new frame between consecutive sync signals. If the amount of new data for a given frame is significantly smaller than an entire frame, host 102 can send all the new data with time to spare. During the extra time, host 102 can allocate processing resources to other operations and can resume transfer of video data after the next sync signal is received.

Controller 216 coordinates the function of display 104, including the transfer of image data from frame register 206 to frame buffer 208, the transfer of data from frame buffer 208 to pixel array 210, and the illumination of pixel array 210 by light source 212. Controller 216 receives control instructions from video extractor 202, which are indicative of the size and location of new frames of image data and are used to direct the overwriting of previous frames (or portions of frames) of image data by frame register 206.

Based on the control instructions from video extractor 202, controller 216 provides control signals to frame register 206, via control bus 232, and to frame buffer 208, via control bus 234, to control the transfer of video data from frame register 206 to frame buffer 208 and also from frame buffer 208 to frame register 206, as needed to facilitate a read-modified-write process. For example, to transfer a row of image data from frame buffer 208 to frame register 206, controller 216 provides a row read signal to frame register 206 and a row address and an output enable signal to frame buffer 208, causing frame buffer 208 to transfer a specified row of image data to frame register 206. To transfer a row of image data from frame register 206 to frame buffer 208, controller 216 provides a row output enable signal to frame register 206 and a row address and a read signal to frame buffer 208, causing frame register 206 to overwrite the data in the row for frame buffer 208 corresponding to the provided row address.

Sequencer 214 provides a series of control signals to controller 216, via control bus 230, which determine the sequence of the data transfer and light source control operations described above. For example, the control signals from sequencer 214 can include a series of row addresses and a frame buffer identifier. The row addresses correspond to the rows of pixel array 210 and frame buffer 208, and the frame buffer identifier indicates which portion (A or B) of frame buffer 208 is being written to or read from. Alternatively, the control signals from sequencer 214 can include a simple count value that progresses from an initial value to a final value, and then continually repeats to process each subsequent frame of video data. These non-limiting examples are provided for illustrative purposes and are not exclusive.

Figure 3:
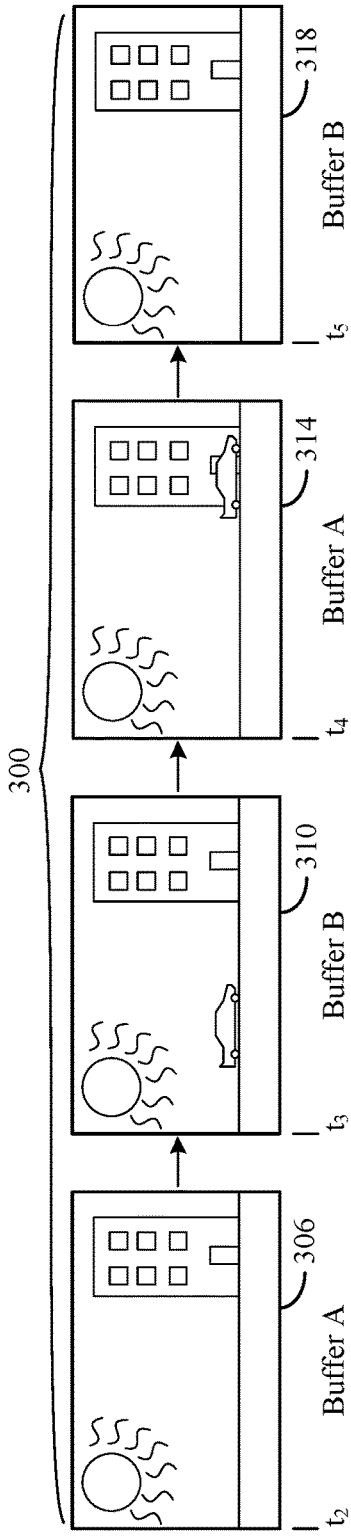
FIG. 3 is a diagram illustrating a method implemented by the display system of FIG. 1.
Figure 3:
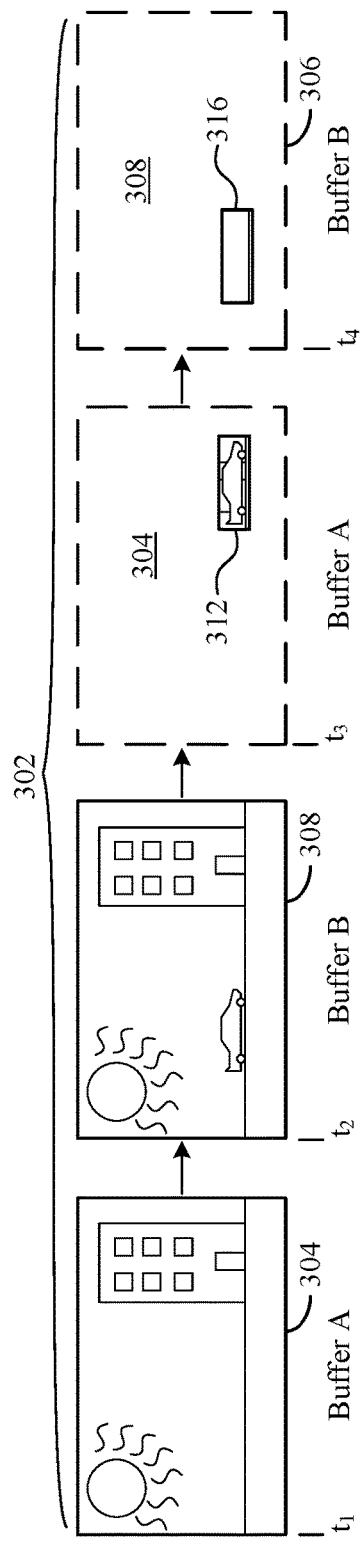

FIG. 3 is a diagram illustrating the relationship between frames of data to be displayed and frames (or portions of frames) of data being written to the data buffer. A sequence 300 of displayed images is labeled to associate each image with the partition of frame buffer 208 in which the data corresponding to the image is stored. A second sequence 302 of windows is also labeled, to associate each image with a partition of frame buffer 208, and illustrates the sequence of writing/updating the data to/in data buffer 208. Time indices ($t_1$, $t_2$, . . . ) are added to show relative timing between writing data to data buffer 208 and displaying the data on pixel array 210.

Initially, starting at time $t_1$, an entire first frame of video data 304, corresponding to the first displayed image 306, is written into Buffer A of frame buffer 208. Then, starting at time $t_2$, a second entire frame of video data 308, corresponding to a second displayed image 310, is written into Buffer B of frame buffer 208. Also starting at $t_2$, the data in Buffer A is displayed on pixel array 210 as first image 306. Next, starting at time t3, a portion of data in Buffer A is overwritten with a window of new data 312. The rest of the first frame of data 304 remains in buffer A. Also starting at time $t_3$, the data in Buffer B is displayed on pixel array 210 as second image 310. Then, starting at time $t_4$, a portion of data in Buffer B is overwritten with a window of new data 316. The rest of the second frame of data 308 remains in buffer B. Also starting at time $t_4$, the data in Buffer A, which includes updated window 312 and the remaining portion of first frame data 304, is displayed on pixel array 210 as a third image 314. Starting at time t5, the data in Buffer B, which includes updated window 316 and the remaining portion of second frame data 310, is displayed on pixel array 210 as a fourth image 318.

Also starting at time $t_5$, new data (either a complete frame or a portion of a frame) can be written into Buffer A and subsequently displayed. If there is no new incoming data during subsequent frame times, then the data remaining in Buffer A and Buffer B will be repeatedly displayed on pixel array 210, until new data is received.

In the foregoing example, it is assumed that Buffer A and Buffer B start out either empty or with data corresponding to an unrelated image. Therefore, the first two of frames of data 304 and 308 include an entire frame of image data corresponding to complete images 306 and 310. For the subsequent frames, the image only changes slightly, and so most of the required image data is already in Frame Buffer A and Frame Buffer B. Therefore, only the small window portions 312 and 316 need to be updated. Portion 312 corresponds to the image of the car and its immediate background. Frame register 206 (FIG. 2) writes only the data portion 312 to Frame Buffer A, which places the car where it belongs in displayed image 314. Data portion 316 corresponds to the image of the background where the car was located in the previous frame. Frame register 206 writes only data portion 316 to Frame Buffer B, which removes the car from displayed image 318. By overwriting only the small portions of the frame that are necessary for displaying the proper images, display system 100 saves substantial processing power and data transfer bandwidth that would otherwise be wasted continually rewriting/transferring old image data.

Figure 4:
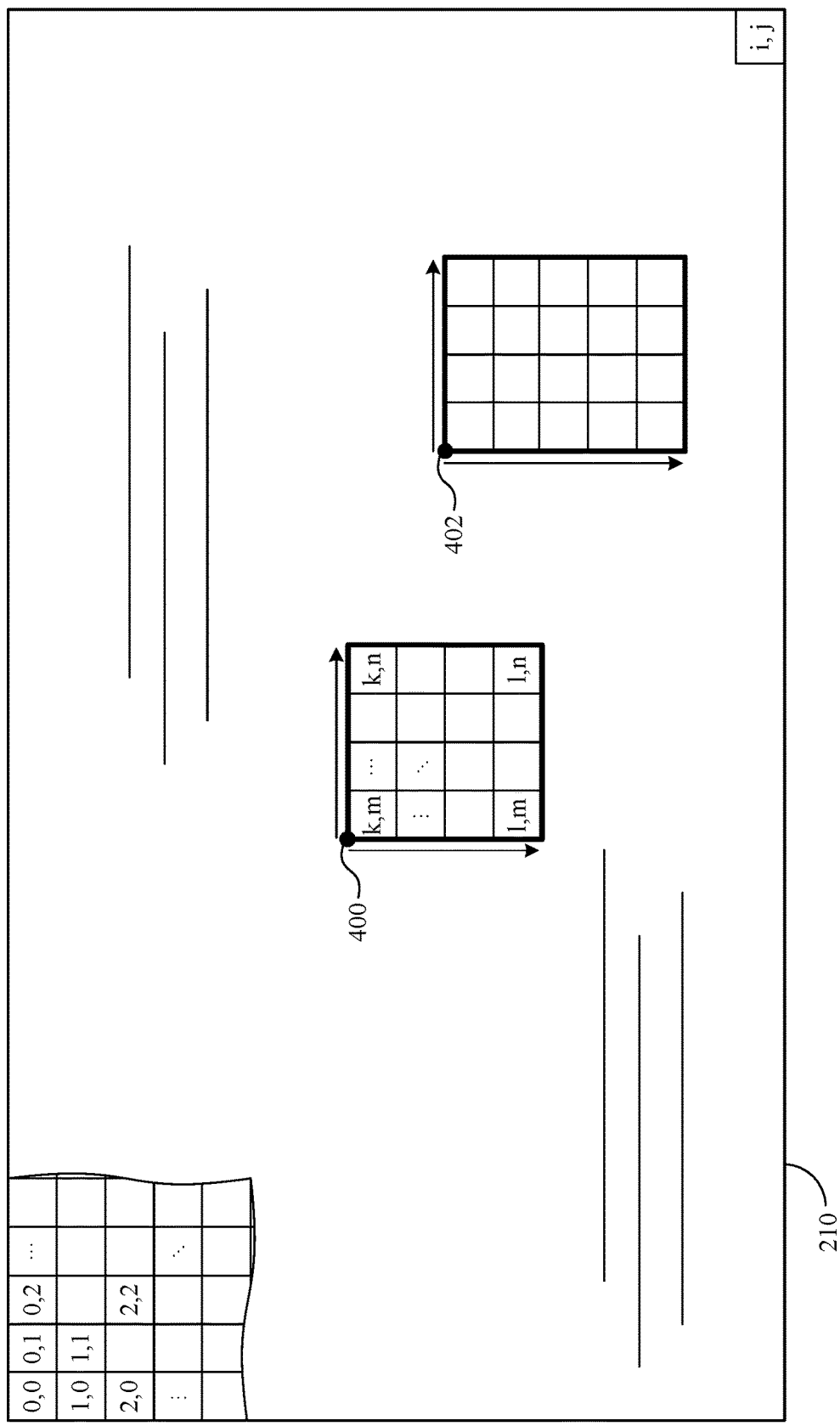
FIG. 4 is a block diagram showing the pixel array of FIG. 2 in greater detail.

FIG. 4 shows pixel array 210, including a plurality of pixels, each labeled with indices "i, j", where "i" corresponds to the vertical location of a given pixel and "j" corresponds to the horizontal position of a given pixel. For example, a pixel in the $400^{th}$ row and the $800^{th}$ column would be labeled "399, 799" (the pixel in the first row and the first column is denoted "0, 0"). Two secondary windows 400 and 402 are shown in separate locations on pixel array 210. Each of secondary windows 400 and 402 are defined by size and location. The location is specified by vertical and horizontal offsets (e.g., the top-most row and left-most column of the window), and the size is specified by vertical and horizontal dimensions (e.g., the height and width of the window). The offset of window 400 is denoted by "k, m", where k is the top-most row and m is the left-most column of window 400. The dimensions of window 400 can then be defined by specifying pixel "1, n", which is located in the bottom-most row and right-most column of window 400. The height (in rows) of window 400 is (l−k+1), and width (in columns) of window 400 is (n−m+1). By including these values (k, m and l, n) in the image data, video extractor 202 is able to communicate to controller 216 exactly where old image data in data buffer 208 should be overwritten by new image data.

Multiple windows of various sizes and shapes can be written over the same frame of image data. As an example, two secondary windows can be written when a moving object to be displayed must be written in a new location and removed from an old location. Multiple moving objects (or other changes in the displayed image) might require multiple sets of secondary windows. The number of secondary windows that can be written over a given frame is only limited by whether or not it is more efficient to write the entire frame rather than all the corresponding secondary windows.

Figure 5:
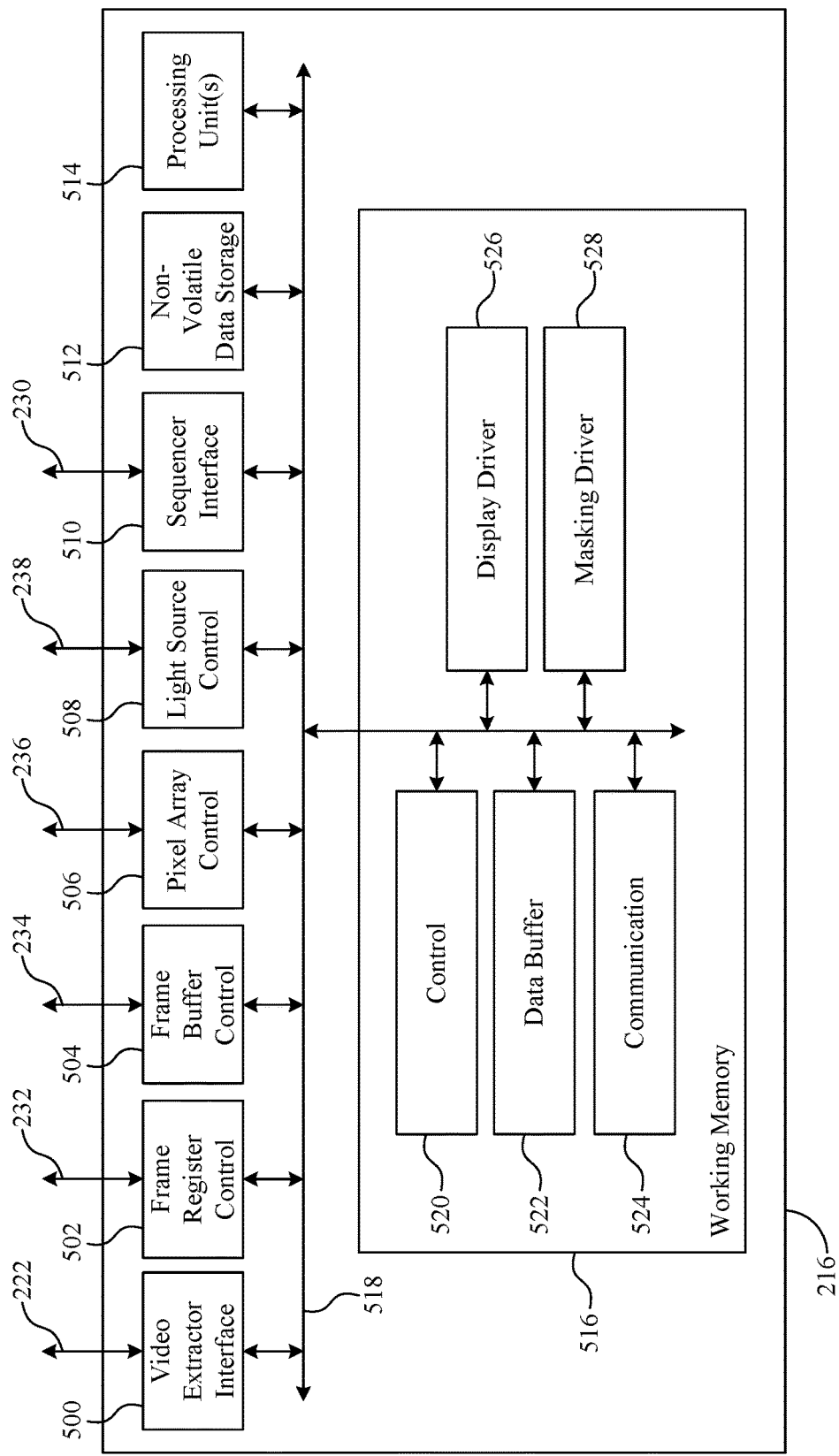
FIG. 5 is a block diagram showing the controller of FIG. 2 in greater detail.

FIG. 5 shows an example embodiment of controller 216, including a video extractor interface 500, a frame register control 502, a frame buffer control 504, a pixel array control 506, a light source control 508, a sequencer interface 510, non-volatile data storage 512, one or more processing unit(s) 514, and a working memory 516. The components of controller 216 communicate with one another via a system bus 518, which is interconnected between the components of controller 216.

Non-volatile data storage 512 stores data and code and retains the data and code even when controller 216 is powered down. Working memory 516 provides temporary storage for data and code. Processing unit(s) 514 impart(s) functionality to the components of controller 216 by executing code stored in non-volatile data storage 512 and/or working memory 516. Some functionality of controller 216 is represented by data and code modules shown within working memory 516. The data and code modules can be transferred (in whole or in part) into and out of working memory 516 from non-volatile data storage 512, as determined by the execution of code by processing unit(s) 514. Although the example embodiment of controller 216 has characteristics of a general purpose computer, the functionality of controller 216 can be implemented with any combination of hardware, software, firmware, and/or computer-readable media.

Video extractor interface 500 facilitates communication between video extractor 202 and controller 216 by, for example, receiving control data from video extractor 202, which can include data indicative of the size and location of windows of data to be written to frame buffer 208. Frame register control 502 asserts control signals onto control bus 232, to facilitate the transfer of image data from line buffer 204 into frame register 206. Frame buffer control 504 asserts control signals onto control bus 234, to facilitate the transfer of image data from frame register 206 into frame buffer 208. Pixel array control 506 asserts control signals onto control bus 236, to facilitate the transfer of image data from frame buffer 208 into pixel array 210. Light source control 508 asserts control signals onto control bus 238 to switch light source 212 between on and off states. Sequencer interface 510 receives the series of control signals generated by sequencer 214 (e.g., a timing sequence), and communicates the control signals to relevant components of controller 216.

Working memory 516 includes a control module 520, a data buffer 522, a communication module 524, a display driver module 526, and a masking driver module 528. Control module 520 is a higher level program that provides overall coordination and control of the other functional aspects of controller 216. Data buffer 522 temporarily stores data to be utilized by the other components of controller 216. Communication module 524 facilitates communication with external devices to receive code/control instructions. Display driver module 526 coordinates the operation of frame buffer control 504, pixel array control 506, and light source control 508, based at least in part on the control signal received from sequencer 214 via sequencer interface 510, to facilitate the display of images by display 104. Masking driver module 528 coordinates the operation of frame register control 502 and frame buffer control 504, based at least in part on control data received from video extractor 202, via video extractor interface 500, to facilitate the selective overwrite of previous image data in frame buffer 208 by frame register 206.

Figure 6:
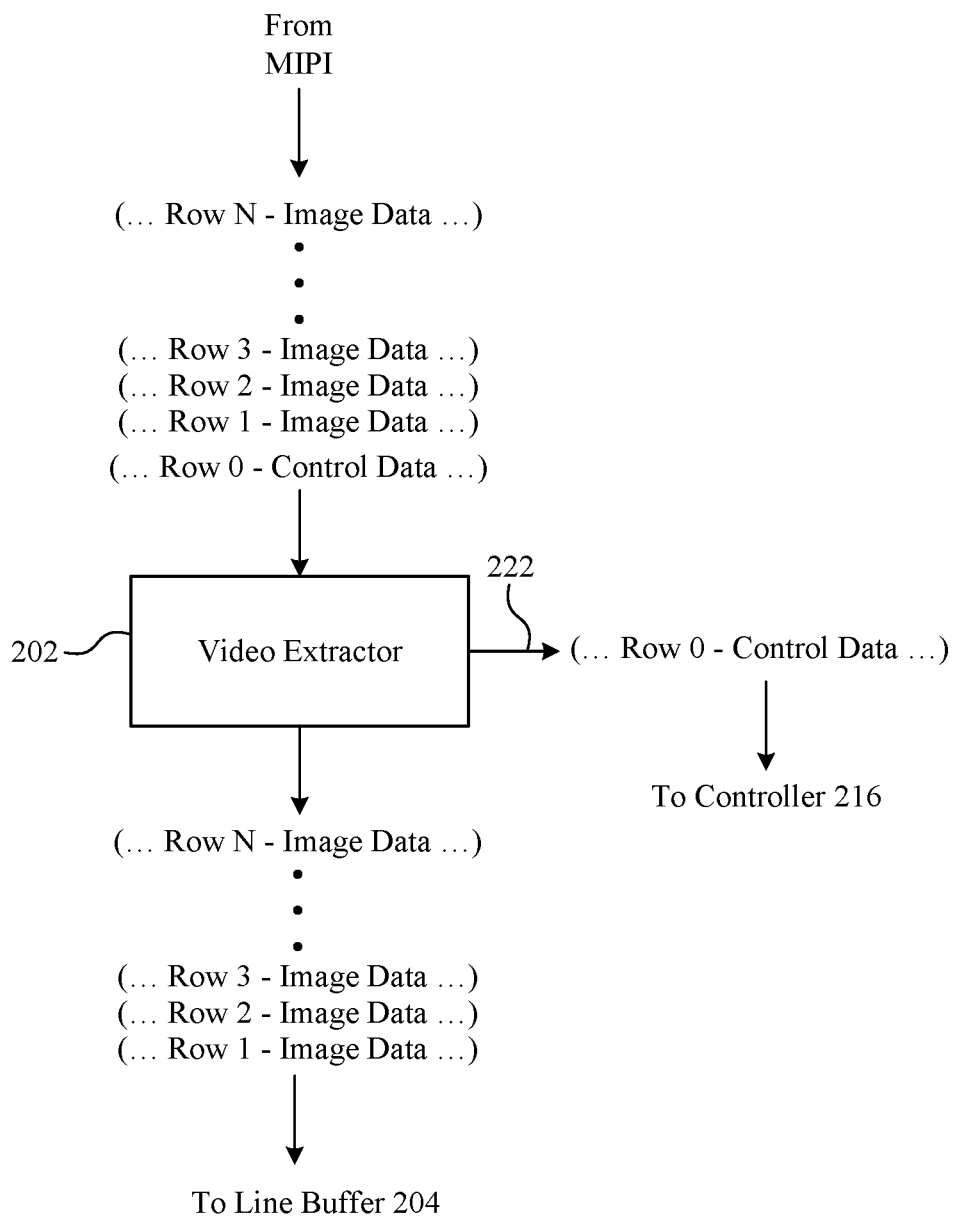
FIG. 6 is a diagram showing data entering and exiting the video extractor of FIG. 2.

FIG. 6 illustrates the flow of data from MIPI 200, through video extractor 202, to line buffer 204, and the provision of control data to controller 216. Data received from MIPI 200 includes control data and image data. In this example embodiment, the control data is included in the data from MIPI 200 as a "row" of control data (e.g., "Row 0"). The image data is provided as a subsequent plurality of rows of image data: "Row 1, Row 2 . . . Row N". The control data includes information that describes the image data it precedes. For example, the control data indicates whether the image data corresponds to an entire frame or a secondary window and, in the case of a secondary window, the size and location of the secondary window with respect to pixel array 210. The image data includes new image data that will be written over at least a portion of a previous frame of image data in frame buffer 208. Video extractor 202 parses the incoming data and provides the rows of image data to line buffer 204 and provides the row of control data to controller 216.

Figure 7:
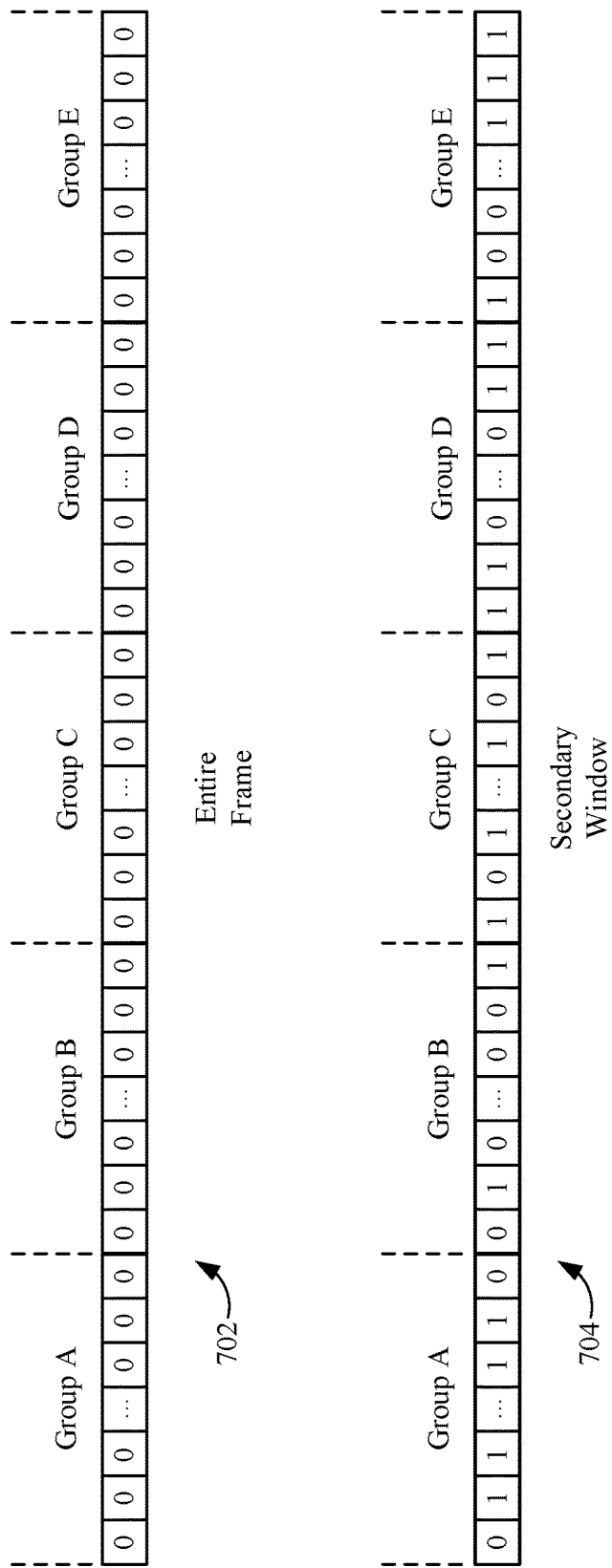
FIG. 7 is a diagram showing the control data of FIG. 6 in greater detail.

FIG. 7 shows two example rows (Row Os) of control data as they are received by video extractor 202. The first example row 702 of control data indicates that an entire frame of image data will follow. Because there is no secondary window to define, the values of the first row of control data are all set to zero. The entire row of zeros indicates that the rows of image data to follow will constitute an entire frame of image data.

The second example row 704 of control data indicates that only a portion (e.g., one or more windows) of a frame of image data will follow. Second row 704 of control data includes a predetermined sequence of bits, which defines the windows to be updated by the data that follows and the color format of the data. In this example, the control data is divided into five groups of bits: group A, group B, group C, group D, and group E.

Group A indicates the color format of the new data to follow. For example, the new data might be for a single color field (e.g., 8-bit red, green, or blue), which would be represented by a particular bit sequence. Alternatively, the new data might include multi-color data (e.g., 24-bit RGB data), which would be represented by a different bit sequence. If the bits of group A are all set to zero, then a default color format is indicated Although group A is shown to include more than 6 bits, in a particularly simple embodiment only 2 bits are required. For example, the value (00) would indicate a default format of 24-bit RGB, which would be the case when video extractor 202A is receiving an entire new frame of RGB image data and the bits of the row of control data are all set to zero. The value (01) would be used to indicate incoming red data, the value (10) would be used to indicate incoming green data, and the value (11) would be used to represent incoming blue data. Of course, much more complicated control data can be used to expand the data/color formats that video extractor 202A is capable of handling.

Group B includes data indicative of an x-offset, and group C includes data indicative of a y-offset, which together identify the upper left corner of the window to be updated. Similarly, group D includes data indicative of an x-offset, and group E includes data indicative of a y-offset, which together identify the lower right corner of the window to be updated.

Groups B-E each includes a sufficient number of data bits to identify any rectangular group of pixels in display 210. For example, in the case of an 8K display, which has a resolution of 7680 rows×4320 columns, 13 bits is sufficient to identify any particular row or column. Therefore, for an 8K display, each of groups B-E can include as few as 13 bits. As a result, in an optional embodiment, a plurality of windows can be defined in a single row of control data.

Figure 8:
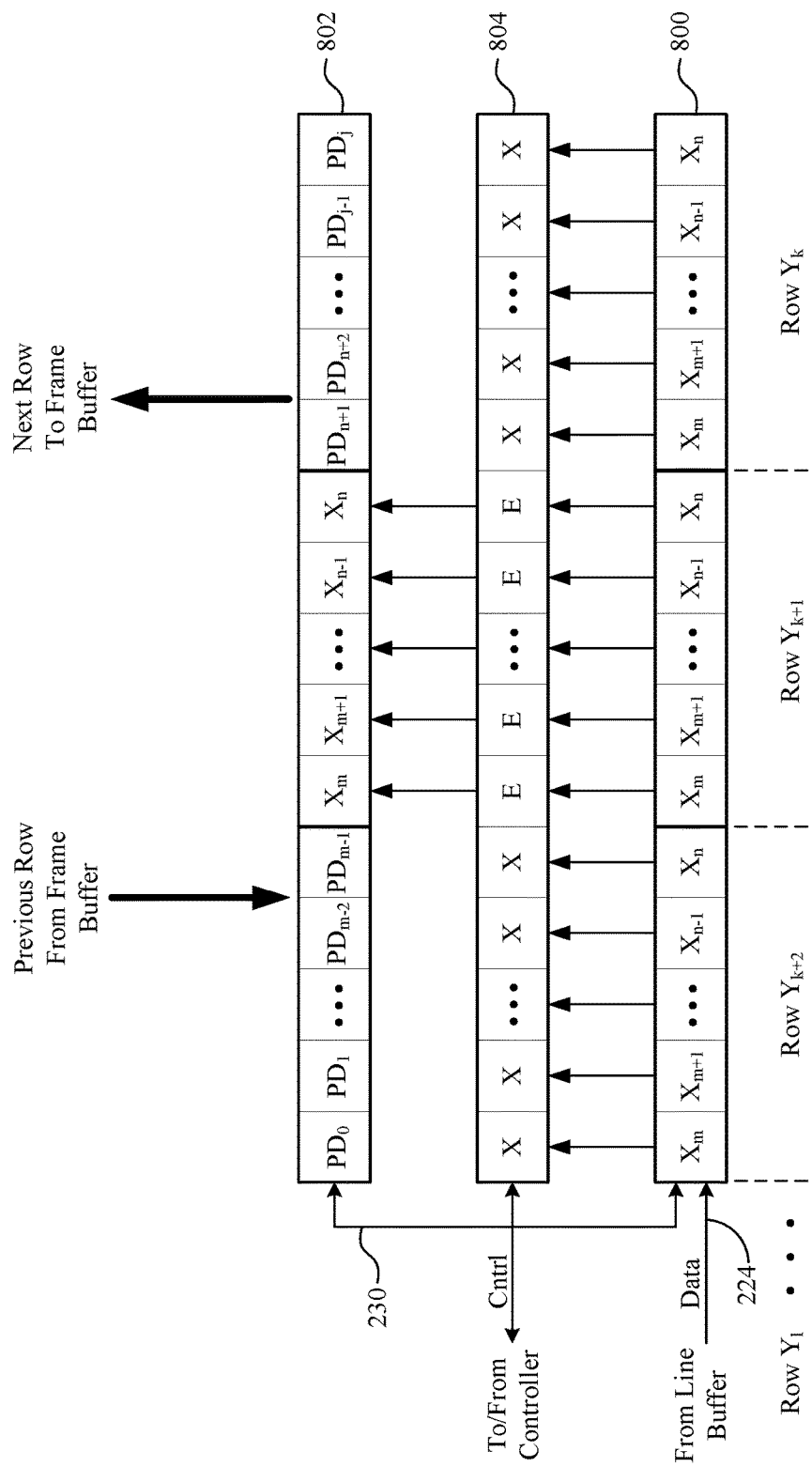
FIG. 8 is a block diagram showing the frame register of FIG. 2 in greater detail.

FIG. 8 shows frame register 206, including a first row register 800, a second row register 802, and a mask register 804. In this embodiment, first row register 800 is a shift register and receives image data from line buffer 204 in portions of single rows. As new data is received, previously received data is shifted to the left, and the new data takes its place. By shifting data into first row register 800, controller 216 can control which columns the incoming data will eventually be written to. Controller 216 can "push" data into first row register 800, using the next rows of data or with random data, which will not be written to second row register 802, as explained below.

A portion of a row of data in frame buffer 208 is updated as follows. While controller 216 shifts a row (or partial row) of image data into the proper position within first row register 800, second row register 800 reads a row of image data into second row register 802 from a corresponding row of frame buffer 208. Controller 216 also shifts masking data into mask register 804, based on the definition of the window to be updated, which is provided in the control data from video extractor 202. Based on the configuration of mask register 804, controller 216 selectively overwrites the data in second row register 802 with the data in first row register 800, to create a row of updated data. The data bits labeled "X" in mask register 804 prevent the corresponding bits of image data in second row register 802 from being overwritten by the bits of image data in first row register 800. The data bits labeled "E" in mask register 804 cause the corresponding bits of image data in second row register 802 to be overwritten by the bits of image data in first row register 800. Controller 216 then causes the contents of second row register 802 to overwrite the entire corresponding row of frame buffer 208 with the updated image data.

Mask register 804 has the capacity of a single row with at least as many columns as pixel array 210. Each column can be in one of a disable or an enable configuration. If a given column on mask register 804 is in a disable configuration, the data of the same column on second row register 802 will not be overwritten by data on first row register 800. Alternatively, if a given column is in an enable configuration, the data of the same column on second row register 802 will be overwritten by data on first row register 800. By sending control signals that alter the configuration of mask register 804, controller 216 directs the selective overwrite of frame buffer 208 one row at a time and facilitates updating less than an entire row of frame buffer 208 with new image data. In this way, previous frames of image data can be overwritten by secondary windows (smaller than a whole frame) to reduce processing requirements and improve frame rate.

To provide a thorough understanding of the present invention, an example method of writing a secondary window to frame buffer 208 will be described with reference to FIGS. 2, 4, 6, 7, and 8. First, MIPI 200 receives data corresponding to secondary window 400 from host 102, via data bus 112. MIPI 200 converts the data to control data and image data and provides the control data and image data to video extractor 202, via data bus 218. Video extractor 202 parses the control data and image data and transfers the control data to controller 216 and the image data to line buffer 204. Controller 216 interprets the control data by analyzing group A, group B, group C, group D, and group E of the control data to determine that secondary window 400 is positioned between an upper left corner at pixel (k,m) and a lower right corner at pixel (l,n). Video extractor 202 also transfers the rows of image data to line buffer 204.

Row $Y_k$ is the first row to be transferred into frame buffer 208. Responsive to signals from controller 216, line buffer 204 transfers a row of image data destined for row $Y_k$, via data bus 224, into first row register 800 of frame register 206. Responsive to the control data received from video extractor 202, controller 216 also shifts configuration data into mask register 804, which determines which columns of data in row $Y_k$ will be overwritten in frame buffer 208. Then, controller 216 causes the data of row $Y_k$ of frame buffer 208 to be copied into second row register 802 of frame register 206. Next, responsive to control signals from controller 216, frame register 206 selectively overwrites the data in second row register 802 with the new image data in first row register 800, according to the mask data in mask register 804. After the selective update, controller 216 causes the updated data in second row register 802 to be written over the data in row $Y_k$ of frame buffer 208.

After row $Y_k$ is transferred to frame buffer 208, row $Y_{k+1}$ of new data is shifted into first row register 800 until column $X_m$ of row $Y_{k+1}$ is latched into column m of first row register 800. Next, controller 216 copies row k+1 from frame buffer 208 into second row register 802. Control instructions from controller 216 then cause the data in first row register 800 to be transferred into second row register 802, with mask register 804, based on its configuration, selectively preventing certain columns from being transferred. The data on second row register 802, now overwritten by the appropriate columns of data in first row register 800, now includes a combination of previous data (labeled "PD") and new data (labeled "X") and makes up a row of updated data. Control instructions from controller 216 then cause the row of updated data to overwrite row k+1 in frame buffer 208.

The process of shifting rows of image data into frame register 206 and selectively overwriting the corresponding row on frame buffer 208 continues until row $Y_l$ is written to frame buffer 208, thus overwriting the image data in frame buffer 208 with new image data corresponding to secondary window 400. The same process is followed to facilitate overwriting image data in frame buffer 208 with the new image data corresponding to secondary window 402.

Now, frame buffer 208 contains two frames of image data, one (in partition A) that was asserted onto pixel array 210 while the other (in partition B) was being overwritten by secondary windows 400 and 402. Based on control signals from controller 216, frame buffer 208 then asserts the updated image data in partition B onto pixel array 210. While the updated data in partition B is being displayed, the next secondary window(s) or frame of image data is written into partition A of frame buffer 208. After each new/updated frame is displayed (e.g., at the end of each modulation period), sequencer 214 sends a sync signal to host 102, indicating that display 104 is ready to receive additional secondary windows or a new frame of image data.

Figure 9:
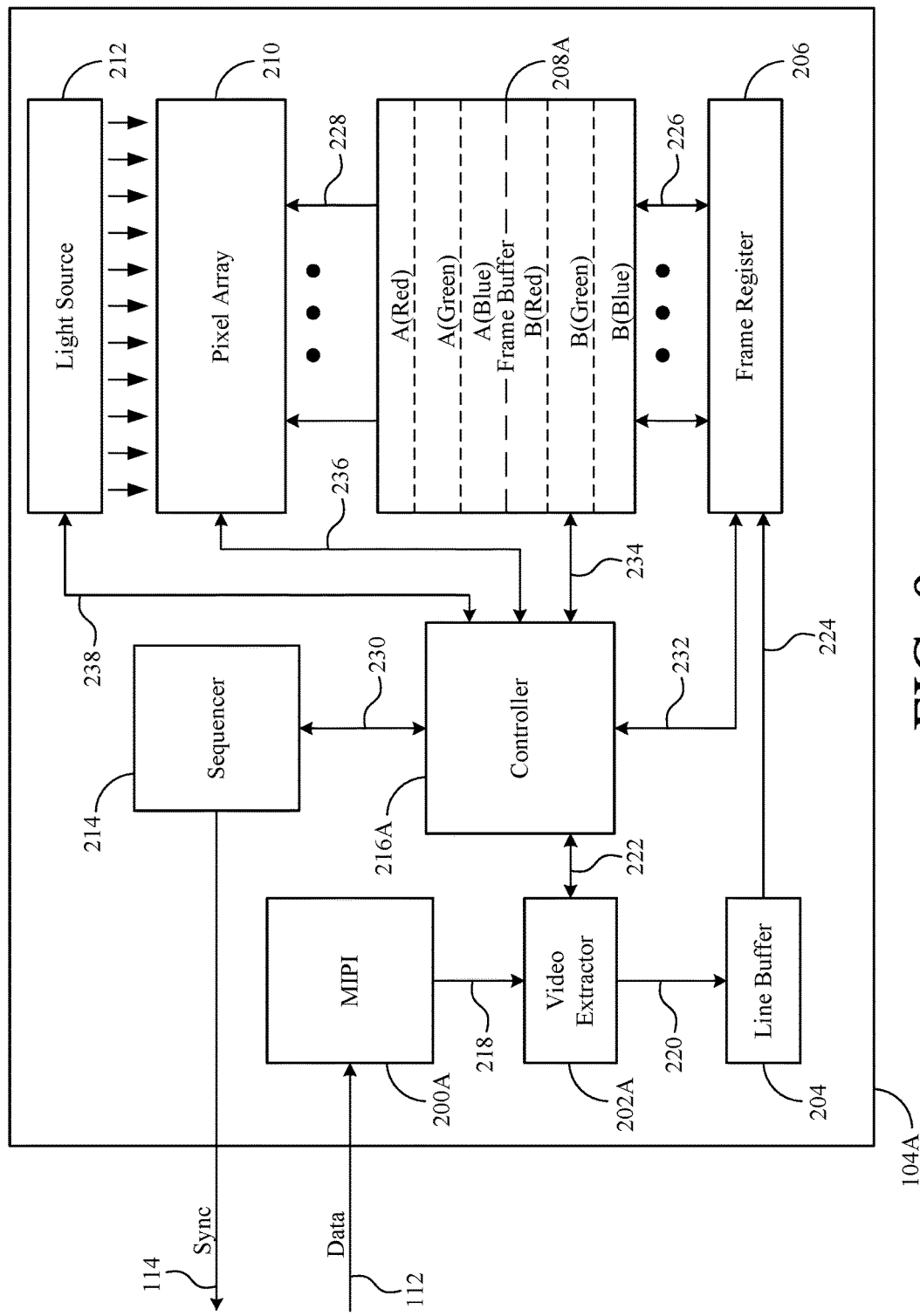
FIG. 9 is a block diagram of an alternate display capable of receiving data in a color field-sequential manner.

FIG. 9 shows an alternate display 104A, which is additionally configured to receive and display image data in a field sequential format. In a field sequential data format, each full field (full frame for one color) or partial field (window of one color) of incoming image data is associated with a distinct color (e.g. red, green, or blue). Display 104A is substantially similar to display 104, but is illustrated separately to show the additional capability of receiving and displaying field sequential image data.

A video extractor 202A receives incoming image data and control data. The control data is included as a first row of data for each color (i.e. a red control row, a green control row, and a blue control row), which will not be displayed. Video extractor 202A parses the control data and the image data, communicates the rows of control data to controller 216A, and communicates the rows of image data to line buffer 204A.

Frame buffer 208A stores frames of image data, which and can be selectively overwritten based, at least in part, on the control signals sent to controller 216A from video extractor 202A. Frame buffer 208A is similar to frame buffer 208, but is labeled to illustrate the field sequential functionality of this embodiment. In particular, portion A and portion B are each divided into three sub-portions (Red, Green, and Blue), where image data corresponding to each particular color is written. In order for data to be written to frame buffer 208A properly, the control data in each control line indicates which color the incoming image data is associated with, the row and column where the data begins, and the row and column where the data ends. As in the previously described embodiment, this information is utilized by controller 216A to direct the transfer of data into the designated portion of frame buffer 208A. Once the image data is written into frame buffer 208A it is displayed on pixel array 210, one color field at a time, in coordination with light source 212 sequentially illuminating pixel array 210 one color at a time.

As explained above, sequencer 214 provides a timing sequence to controller 216A and sends a periodic sync signal to host 102. The sync signal defines a temporal window (frame time), during which host 102 can send image data for a particular frame. Because each frame of image data includes multiple color fields, each color field (or portions of a color field) should be sent in a fraction of the frame time. For example, for 3 color image data (e.g., RGB) and a 16.5 msec frame time, each color field (or portions of the color field) should be sent in a 5.5 ms field time. The times for each filed can vary, however, as long as all of the data for a given frame is provided during the frame time. Optionally, sequencer 214 can be configured to provide a series of sync signals based on a field time (e.g., every 5.5 msec).

Figure 10:
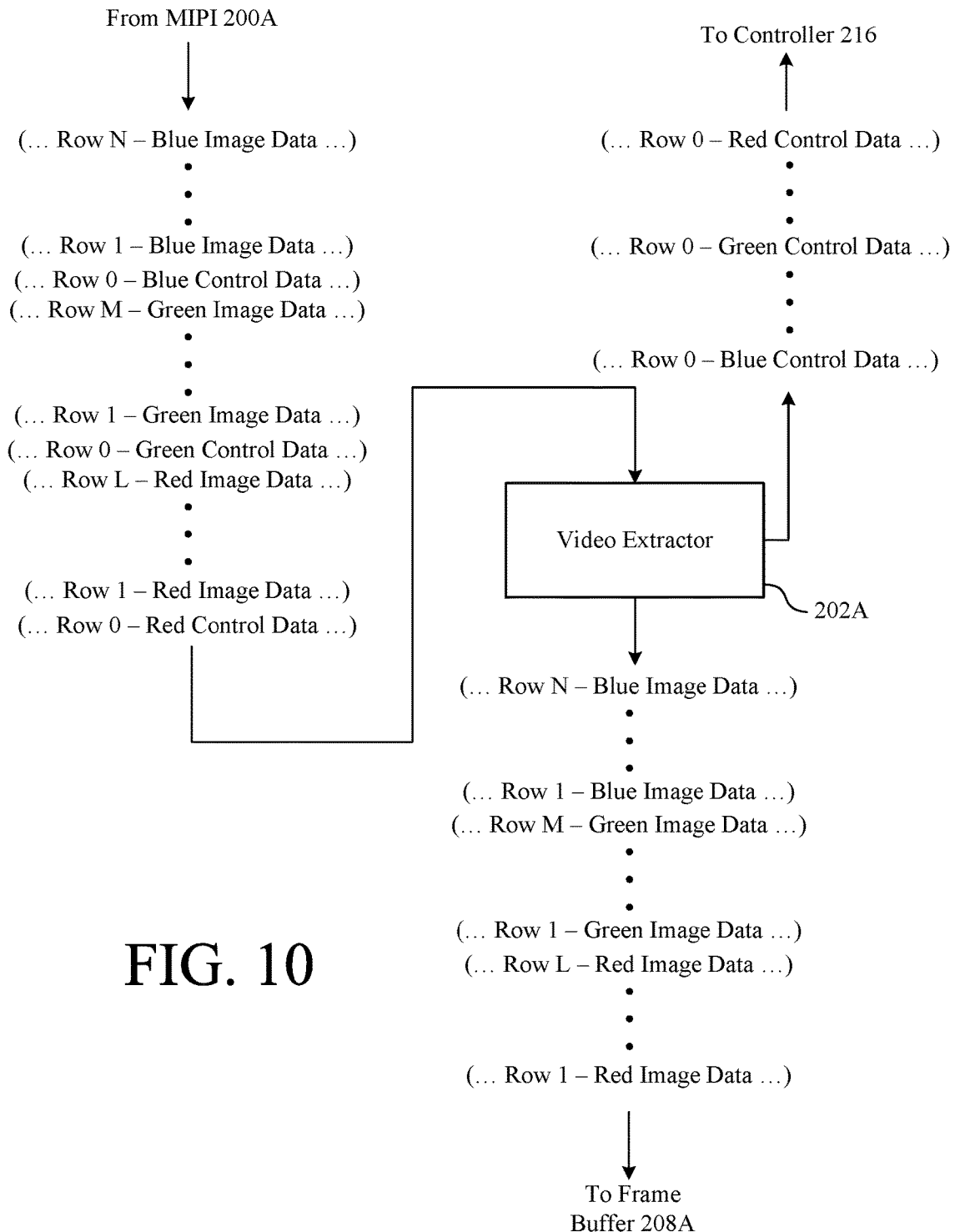
FIG. 10 is a diagram showing data entering and exiting the video extractor of FIG. 9 in a color field sequential manner.

FIG. 10 shows the flow of image data and control data through video extractor 202A. As explained above, each set of data received by video extractor 202A includes a row of control data (Row 0) and one or more rows of image data (Row 1, Row 2 . . . Row L). The control data includes information that describes the image data it precedes. For example, the control data identifies a particular color associated with the image data, indicates whether the image data corresponds to an entire color field or a secondary window, and in the case of a secondary window, identifies the size and location of the secondary window. The image data includes new image data that will overwrite the previous frame in frame buffer 208A. Video extractor 202A parses the incoming data and sends the rows of image data to frame buffer 208A and sends the rows of control data (or at least the useful portion of the control data) to controller 216A.

It should be understood that the embodiment of FIG. 9 is a particular example of the embodiment of FIG. 2. In particular, display 104 of FIG. 2 is capable of receiving and processing multi-color data (e.g., 24-bit RGB) and field-sequential data. Display 104A of FIG. 9 is substantially similar, but labeled and described to clarify the field-sequential aspect of the present invention.

Figure 11:
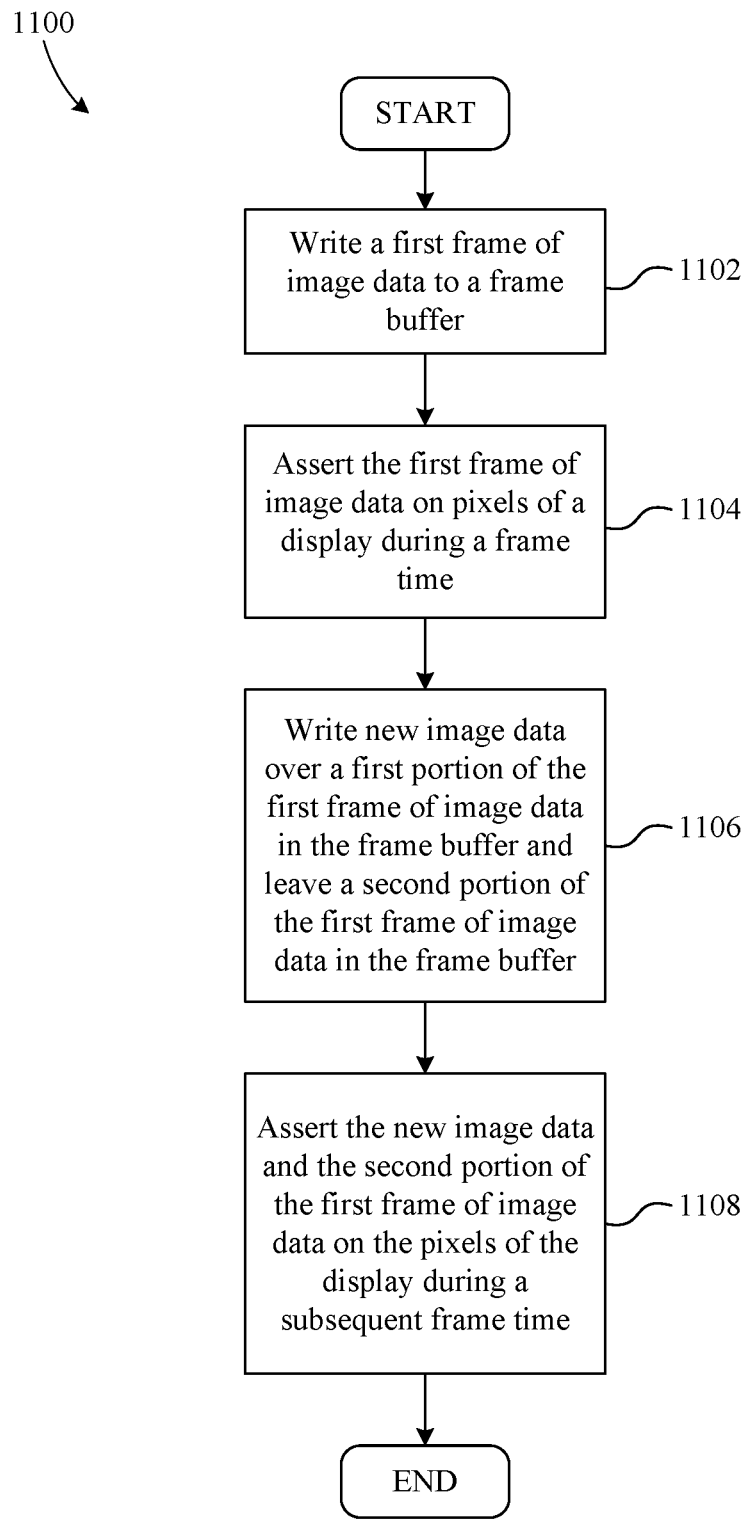
FIG. 11 is a flowchart summarizing an example method of writing new data to a display.

FIG. 11 is a flow chart summarizing an example method 1100 of writing new data to a display. In a first step 1102, a first frame of image data is written to a frame buffer. Next, in a second step 1104, the first frame of image data is asserted on pixels of the display during a frame time. Then, in a third step 1106, new image data is written over a first portion of the first frame of image data in the frame buffer, and a second portion of the first frame of image data is left in the frame buffer. Finally, in a fourth step 1108, the new image data and the second portion of the first frame of image data are asserted on the pixels of the display during a subsequent frame time.

Figure 12:
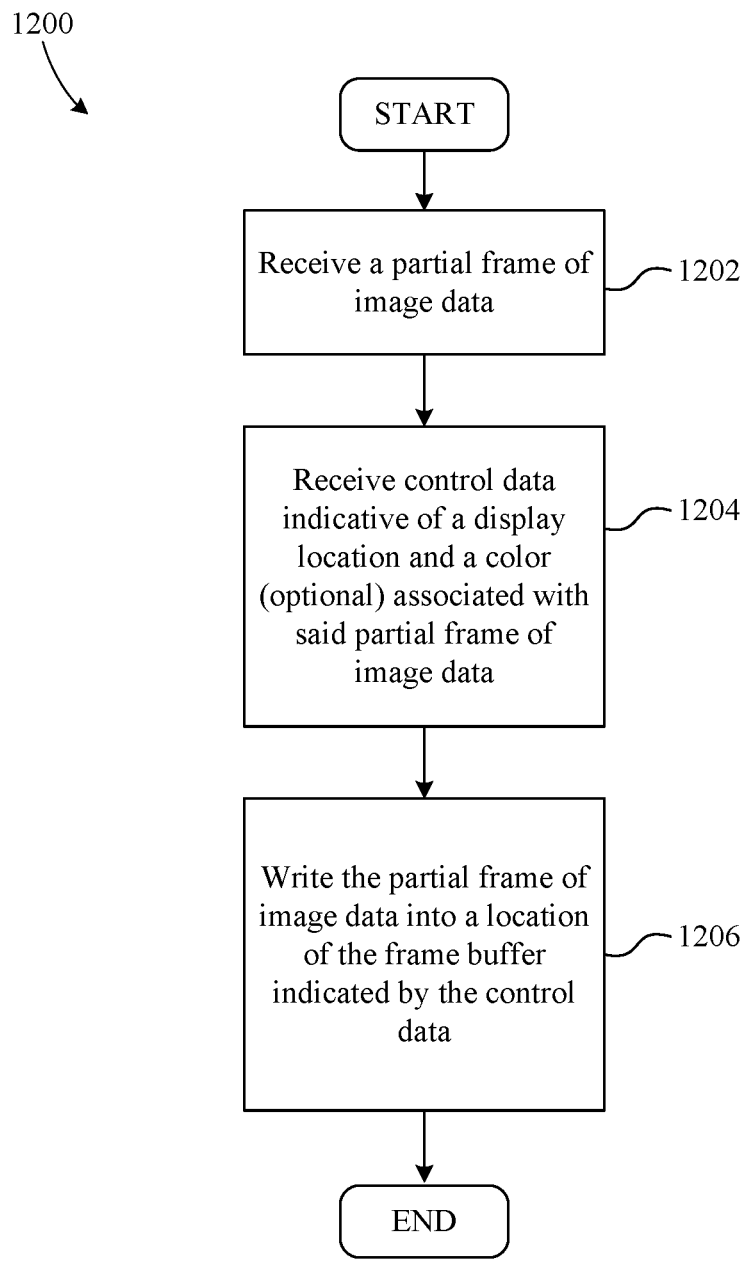
FIG. 12 is a flowchart summarizing an example method of performing the third step (write new image data) of the method of FIG. 11.

FIG. 12 is a flowchart summarizing an example method of performing third step 1106 of the method 1100 of FIG. 11. In a first step 1202, a partial frame of image data is received. Next, in a second step 1204, control data indicative of a display location and, optionally, a color associated with the partial frame of image data are received. Then, in a third step 1206, the partial frame of image data is written into a location of the frame buffer indicated by the control data.

The description of particular embodiments of the present invention is now complete. Many of the described features may be substituted, altered or omitted without departing from the scope of the invention. For example, alternate interfaces (e.g., a serial digital interface) may be substituted for MIPI 200. As another example, a single frame buffer may be substituted for dual frame buffer 208. These and other deviations from the particular embodiments shown will be apparent to those skilled in the art, particularly in view of the foregoing disclosure.

We claim:
1. A digital display system, comprising:
a pixel array;
a data buffer electrically coupled to receive and store image data and operative to provide said image data to said pixel array, said data buffer including a first portion configured to store a complete frame of data; and
a display driver electrically coupled to provide said image data and control signals to said data buffer, said display driver including a controller operative to
write a first frame of image data to said first portion of said data buffer,
cause said first frame of image data to be asserted on said pixels of said array during a first frame time,
write new image data over a first portion of said first frame of image data in said first portion of said data buffer and leave a second portion of said first frame of image data in said first portion of said data buffer, and
cause said new image data and said second portion of said first frame of image data to be asserted on said pixels of said array during a same frame time subsequent to said first frame time; and wherein
said display driver is operative to
write a row of said new image data to a first row register;
copy a corresponding row of image data from said data buffer into a second row register;
selectively overwrite one or more portions of said corresponding row of image data in said second row register with one or more portions of said row of said new image data in said first row register to create a row of updated image data in said second row register; and
overwrite said corresponding row of image data in said data buffer with said row of updated image data from said second row register.
2. The system of claim 1, wherein said display driver is configured to receive data indicative of a location of said first portion of image data in said first portion of said data buffer and write said new image data to said location.

3. The system of claim 2, wherein:
said first frame of image data corresponds to an image to be displayed on said display; and
said location corresponds to a rectangular portion of said image.

4. The system of claim 2, wherein said display driver is configured to write new image data over the entirety of said first frame of image data if said data indicative of said location of said first portion of image data in said first portion of said data buffer is equal to one of a set of predefined values.

5. The system of claim 1, wherein said display driver provides synchronization signals to a source of said image data, each of said synchronization signals indicating the beginning of a time period when at least a portion of a next frame of image data can be sent.

6. The system of claim 5, wherein said display driver provides consecutive ones of said synchronization signals periodically, said period of said synchronization signals corresponding to an amount of time required to assert a full frame of image data onto said pixel array.

7. The system of claim 1, wherein:
said display driver further includes a mask register operative to receive a row of mask values from said controller, each mask value corresponding to an associated image data value in said first row register and an associated image data value in said second row register;
responsive to a first mask value, the associated image data value in said second row register is overwritten by said associated image data value in said first row register; and
responsive to a second mask value, the associated image data value in said second row register is not overwritten by said associated image data value in said first row register.

8. The system of claim 1, wherein said display driver:
receives new data in a first format; and
converts said data to a second format, creating said new image data.

9. The system of claim 1, wherein:
said data buffer includes a second portion configured to store an additional complete frame of image data; and
said controller is additionally operative to
write a second frame of image data to said second portion of said data buffer,
cause said second frame of image data to be asserted on said pixels of said display during an intermediate frame time between said first frame time and said subsequent frame time;
write additional new image data over a first portion of said second frame of image data in second portion of said data buffer and leave a second portion of said second frame of image data in said second portion of said data buffer, and
cause said additional new image data and said second portion of said second frame of image data to be asserted on said pixels of said display during a same fourth frame time after said same frame time subsequent to said first frame time.

10. In a display driver circuit, a method for writing image data to a display, said method comprising:
writing a first frame of image data to a frame buffer;
causing said first frame of image data to be asserted on pixels of said display during a frame time;
writing new image data over a first portion of said first frame of image data in said frame buffer and leaving a second portion of said first frame of image data in said frame buffer;
causing said new image data and said second portion of said first frame of image data to be asserted on said pixels of said display during a second frame time subsequent to said frame time;
writing a row of said new image data to a first row register;
copying a corresponding row of image data from said frame buffer into a second row register;
selectively overwriting one or more portions of said corresponding row of image data with one or more portions of said row of said new image data in said first row register to create a row of updated image data in said second row register; and
overwriting said corresponding row of image data in said frame buffer with said row of updated image data.

11. The method of claim 10, wherein said step of writing new image data over a first portion of said first frame of image data includes:
receiving data indicative of a location of said first portion of image data in said frame buffer; and
writing said new image data to said location.

12. The method of claim 11, wherein:
said first frame of image data corresponds to an image to be displayed on said display; and
said location corresponds to a rectangular portion of said image.

13. The method of claim 11, wherein said step of writing new image data over a first portion of said first frame of image data in said frame buffer includes writing new image data over the entirety of said first frame of image data if said data indicative of said location of said first portion of image data in said frame buffer is equal to one of a set of predefined values.

14. The method of claim 10, further comprising providing synchronization signals to a source of said image data, each of said synchronization signals indicating the beginning of a time period when at least a portion of a next frame of image data can be provided to said display driver circuit.

15. The method of claim 14, wherein said step of providing synchronization signals to said source of said image data further includes providing consecutive ones of said synchronization signals periodically, the period of said synchronization signals corresponding to an amount of time required to assert a full frame of said image data onto said pixel array.

16. The method of claim 10, wherein said step of selectively overwriting one or more portions of said corresponding row of image data with one or more portions of said row of said new image data includes generating a row of mask values and selectively overwriting said one or more portions of said corresponding row of image data based on said row of mask values.

17. The method of claim 10, wherein said step of writing new image data over a first portion of said first frame of image data in said frame buffer includes:
receiving new data in a first format; and
converting said new data to a second format, creating said new image data.

18. The method of claim 10, wherein said step of writing a first frame of image data to a frame buffer includes writing said first frame of image data to a first portion of said frame buffer, and further comprising:

writing a second frame of image data to a second portion of said frame buffer;
causing said second frame of image data to be asserted on pixels of said display during an intermediate frame time between said first frame time and said second frame time;
writing additional new image data over a first portion of said second frame of image data in said second portion of said frame buffer and leaving a second portion of said second frame of image data in said frame buffer; and
causing said additional new image data and said second portion of said second frame of image data to be asserted on said pixels of said display during a fourth frame time after said second frame time.

19. A digital display system, comprising:
a pixel array;
a data buffer electrically coupled to receive and store image data and operative to provide said image data to said pixel array, said data buffer including a first portion configured to store a complete frame of data; and
a display driver electrically coupled to provide said image data and control signals to said data buffer, said display driver including a controller operative to
write a first frame of image data to said first portion of said data buffer,
cause said first frame of image data to be asserted on said pixels of said array during a first frame time,
write new image data over a first portion of said first frame of image data in said first portion of said data buffer and leave a second portion of said first frame of image data in said first portion of said data buffer, and
cause said new image data and said second portion of said first frame of image data to be asserted on said pixels of said array during a second frame time subsequent to said first frame time; and wherein
said data buffer includes a second portion configured to store an additional complete frame of image data; and
said controller is additionally operative to
write a second frame of image data to said second portion of said data buffer,
cause said second frame of image data to be asserted on said pixels of said display during an intermediate frame time between said first frame time and said second frame time;
write additional new image data over a first portion of said second frame of image data in said second portion of said data buffer and leave a second portion of said second frame of image data in said second portion of said data buffer, and
cause said additional new image data and said second portion of said second frame of image data to be asserted on said pixels of said display during a fourth frame time after said subsequent frame time.

20. The system of claim 19, wherein said display driver is configured to receive data indicative of a location of said first portion of image data in said first portion of said data buffer and write said new image data to said location.

21. The system of claim 20, wherein:
said first frame of image data corresponds to an image to be displayed on said display; and
said location corresponds to a rectangular portion of said image.

22. The system of claim 20, wherein said display driver is configured to write new image data over the entirety of said first frame of image data if said data indicative of said location of said first portion of image data in said first portion of said data buffer is equal to one of a set of predefined values.

23. The system of claim 19, wherein said display driver provides synchronization signals to a source of said image data, each of said synchronization signals indicating the beginning of a time period when at least a portion of a next frame of image data can be sent.

24. The system of claim 23, wherein said display driver provides consecutive ones of said synchronization signals periodically, said period of said synchronization signals corresponding to an amount of time required to assert a full frame of image data onto said pixel array.

25. The system of claim 19, wherein:
said display driver is operative to
write a row of said new image data to a first row register,
copy a corresponding row of image data from said data buffer into a second row register,
selectively overwrite one or more portions of said corresponding row of image data in said second row register with one or more portions of said row of said new image data in said first row register to create a row of updated image data in said second row register, and
overwrite said corresponding row of image data in said data buffer with said row of updated image data from said second row register,
said display driver further includes a mask register operative to receive a row of mask values from said controller, each mask value corresponding to an associated image data value in said first row register and an associated image data value in said second row register;
responsive to a first mask value, the associated image data value in said second row register is overwritten by said associated image data value in said first row register; and
responsive to a second mask value, the associated image data value in said second row register is not overwritten by said associated image data value in said first row register.

26. The system of claim 19, wherein said display driver:
receives new data in a first format; and
converts said data to a second format, creating said new image data.

27. In a display driver circuit, a method for writing image data to a display, said method comprising:
writing a first frame of image data to a frame buffer;
causing said first frame of image data to be asserted on pixels of said display during a frame time;
writing new image data over a first portion of said first frame of image data in said frame buffer and leaving a second portion of said first frame of image data in said frame buffer; and
causing said new image data and said second portion of said first frame of image data to be asserted on said pixels of said display during a second frame time; and wherein
said step of writing a first frame of image data to a frame buffer includes writing said first frame of image data to a first portion of said frame buffer, and further comprising
writing a second frame of image data to a second portion of said frame buffer;

causing said second frame of image data to be asserted on pixels of said display during an intermediate frame time between said first frame time and said second frame time;

writing additional new image data over a first portion of said second frame of image data in said second portion of said frame buffer and leaving a second portion of said second frame of image data in said frame buffer; and causing said additional new image data and said second portion of said second frame of image data to be asserted on said pixels of said display during a fourth frame time after said second frame time.

28. The method of claim 27, wherein said step of writing new image data over a first portion of said first frame of image data includes:

receiving data indicative of a location of said first portion of image data in said frame buffer; and writing said new image data to said location.

29. The method of claim 28, wherein:

said first frame of image data corresponds to an image to be displayed on said display; and said location corresponds to a rectangular portion of said image.

30. The method of claim 28, wherein said step of writing new image data over a first portion of said first frame of image data in said frame buffer includes writing new image data over the entirety of said first frame of image data if said data indicative of said location of said first portion of image data in said frame buffer is equal to one of a set of predefined values.

31. The method of claim 27, further comprising providing synchronization signals to a source of said image data, each of said synchronization signals indicating the beginning of a time period when at least a portion of a next frame of image data can be provided to said display driver circuit.

32. The method of claim 31, wherein said step of providing synchronization signals to said source of said image data further includes providing consecutive ones of said synchronization signals periodically, the period of said synchronization signals corresponding to an amount of time required to assert a full frame of said image data onto said pixel array.

33. The method of claim 27, further comprising:

writing a row of said new image data to a first row register;

copying a corresponding row of image data from said frame buffer into a second row register;

selectively overwriting one or more portions of said corresponding row of image data with one or more portions of said row of said new image data in said first row register to create a row of updated image data in said second row register; and overwriting said corresponding row of image data in said frame buffer with said row of updated image data; and wherein said step of selectively overwriting one or more portions of said corresponding row of image data with one or more portions of said row of said new image data includes generating a row of mask values and selectively overwriting said one or more portions of said corresponding row of image data based on said row of mask values.

34. The method of claim 27, wherein said step of writing new image data over a first portion of said first frame of image data in said frame buffer includes:

receiving new data in a first format; and converting said new data to a second format, creating said new image data.

\* \* \* \* \*